FIG. IB

INVENTOR
C. S. WILCOX
BY Jeremiah G. Duggan
HIS ATTORNEY

Dec. 2, 1969          C. S. WILCOX          3,482,090
FREQUENCY RESPONSIVE TRAIN SPEED CONTROL APPARATUS
Filed Dec. 6, 1967                    3 Sheets-Sheet 3

INVENTOR
C.S. WILCOX

BY
HIS ATTORNEY

United States Patent Office 3,482,090
Patented Dec. 2, 1969

3,482,090
FREQUENCY RESPONSIVE TRAIN SPEED CONTROL APPARATUS
Clinton S. Wilcox, Rochester, N.Y., assignor to General Signal Corporation, Rochester, N.Y., a corporation of New York
Filed Dec. 6, 1967, Ser. No. 688,445
Int. Cl. B61l 3/00; B61b 13/00
U.S. Cl. 246—182      10 Claims

ABSTRACT OF THE DISCLOSURE

Train overspeed indicating apparatus wherein an axle driven generator produces a frequency analog of speed, and an oscillator is controlled by speed select signals to have a frequency greater than that of the generator at the desired speed. A detector controlled by speed select signals produces a pulse whenever the sum frequency of both signals exceeds that of the desired speed. A feedback switch stops the oscillator whenever a particular number of detector pulses are produced within a selected period. A relay is energized by intermittent operation resulting from the feedback switch. The frequency of the oscillator decreases whenever the speed select signal decreases; the detector frequency characteristic is converse. Decrease in speed select signals greater than a particular amount causes the oscillator frequency to fall below the rising detector frequency preventing intermittent operation and indicating overspeed. A relay energized by the intermittent frequency detector output and the axle generator output provides an indication of train motion, preventing unsafe overspeed upon failure of the generator.

BACKGROUND OF THE INVENTION

This invention relates to train speed control and more particularly to an improved frequency responsive speed control apparatus.

In automatic train speed control it has been customary to employ frequency responsive devices to indicate train speeds in excess of desired or safe speeds as determined by associated control equipment. Generally the output of a frequency generator responsive to the speed of the train is measured and an indication of overspeed with a resultant brake application is given whenever the frequency of the output signal exceeds a predetermined value relative to the desired or safe speed limit.

Practical systems utilized for this purpose impose a variable speed limit on the train; imposition of varying speeds being required for maximum utilization of train capacity while still providing safety limits. The signal output of an axle driven generator is applied to a frequency detector which produces an output whenever the frequency exceeds a value commensurate with the desired speed.

Since speed control or governor systems are intrinsically involved with the safety of the train, it is necessary that the integrity of the governor be continuously checked. Checking is accomplished by introducing into the system an oscillator providing a signal frequency somewhat in excess of the desired detection frequency. This oscillator signal is, in addition to the axle generator signal, imposed on the frequency detector; since it is greater than the desired or predetermined detection frequency it produces an output from the frequency detector which output indicates integrity of the circuitry. In conjunction with this oscillator a feedback switching network shuts down the oscillator whenever an output is sensed from the frequency detector, and thusly a continuously alternating checking operation is established, i.e., the check frequency oscillator signal is detected by the frequency detector which produces an output signal in turn shutting down the oscillator. Obviously this checking and resultant shutting down will continue as long as the integrity of the system remains intact. To further add to the fail-safe qualities of such systems a relay is energized to indicate that the train is proceeding in an underspeed condition, which relay energization is maintained as long as the output from the frequency detector is provided on the intermittent basis previously described. If at any time intermittent operation of the check signal fails, which may result from absence of the oscillator frequency, presence of an axle generator signal in excess of the detection frequency, or circuit malfunction, the underspeed relay indicator is deenergized and imposes upon the train an overspeed condition resulting in the application of safety measures.

A further difficulty of which prior art systems have taken cognizance concerns a complete failure in the output of the axle generator which may result in the train attaining an overspeed condition without causing deenergization of the overspeed relay. To obviate this problem prior art systems have included circuitry of the axle generator in the check frequency oscillator. Thus, if the axle generator output fails by malfunctioning of its electrical circuitry the oscillator shuts down producing an overspeed indication calling for the implementation of safety measures.

The prior art discloses a frequency responsive system which competently and with a high degree of reliability indicates any excursion of the train into an overspeed condition. It further provides a degree of safety by checking the integrity of the frequency responsive circuitry and the axle driven frequency generator. There are, however, problems not obviated by the prior art which affect the safety of the train by introducing instances where an overspeed condition may be attained and no indication given to the train controls.

A circumstance in which this probability exists concerns the detection frequency characteristic of the frequency detector. Prior art frequency detectors for detecting overspeed frequencies over a range of values comprise a transistor which is triggered into a conducting state by the buildup of voltage across a capacitor. Pulses associated with the input from either the check oscillator or the axle generator initiate an accumulation of charge on the capacitor, which charge is proportional to a particular speed select signal derived from auxiliary control equipment. As a higher detection frequency is required the speed select voltage is lowered, and vice versa, i.e., obviously, it takes a greater number of pulses at a lower charging voltage to accumulate the necessary charge across the capacitor to trigger the transistor within a given interval. Such a frequency detection device is dependent therefore, upon any changes in speed select signal level.

A common fault often present in equipment supplying speed select signals is the buildup of contact resistances, supply voltage change, etc., in the supply switching and relay circuitry causing the signal voltage to decrease, thereby raising the magnitude of the detection frequency for which an output signal is given. This results in creating a situation where although the output of the axle generator has increased to a value beyond that associated with the desired or safe speed, the frequency detector still fails to indicate such condition and continually provides the intermittent input signal necessary to energization of the underspeed relay. This creates a potentially unsafe factor to which a train being operated under automatic controls may not be subjected.

Another situation which may cause a serious overspeed condition, involves failure in output of the axle frequency generator. If the axle generator fails, it often results from a breakdown in the electrical circuitry and under such circumstances the prior art systems indicate this failure and impose safety measures. However, there is yet another common mode of failure for axle generator which involves a mechanical disorientation of the structure, resulting in failure of the output without any noticeable change in the electrical circuitry. The lack of a generator signal prevents the detector from producing a continuous output signal during overspeed thereby keeping the underspeed relay energized. Thus prior art systems organized as set forth do not take cognizance of such potential failure and may fail to indicate an overspeed condition.

It is therefore an object of this invention to provide a frequency responsive overspeed indicator which indicates an unsafe condition whenever the detection frequency decreases below a predetermined value as a result of a decrease in the speed selected signal.

Another object of this invention is to provide a frequency responsive overspeed indicator which will indicate an unsafe condition upon the failure in output of the axle frequency generator.

Another object of this invention is to provide a solid state relay driver circuit which continuously energizes a relay when receiving intermittent signals.

SUMMARY OF THE INVENTION

Briefly the present invention contemplates an improved frequency responsive apparatus for indicating train overspeed with respect to a desired speed dictated by speed select signals. A generator is adapted to provide a signal having a frequency proportional to train speed. An oscillator, controlled by a speed select signal, provides an output frequency exceeding the generator output frequency relative to the desired speed. A detector which is responsive to the sum of the generator and oscillator frequency signals is controlled by a second speed select signal to provide a signal output whenever the sum frequency signal exceeds the frequency relative to the desired speed. The frequency detector displays a response characteristic which varies inversely to changes in the detected speed select signal. Circuit means responsive to the detector output is effective to render the oscillator inoperative and provide an output signal whenever the sum of the detector input signals exceeds the desired speed frequency for a predetermined period, thereby providing intermittent output signals as long as only the oscillator signal exceeds the desired speed frequency. An indicator means is energized by the circuit means output as long as such output reoccurs at greater than a minimum rate, deenergization of the indicator means manifests an overspeed condition.

The improvement of this invention comprises an oscillator adapted to display a frequency output characteristic which varies directly with respect to changes in the oscillator speed select signal whereby an overspeed condition is prevented from occurring when the oscillator and detector speed select signals each respectively decrease more than preselected magnitudes causing the oscillator frequency to fall below the detector frequency which affects a loss of the recurrent detector output and deenergizes the indicator means, thereby manifesting an overspeed condition. The improvement further includes means which is responsive to the recurrent circuit means output and the generator signal for indicating vehicle motion when in an underspeed condition and responsive to only the generator signal for indicating motion during an overspeed condition.

A better understanding of the present invention together with other and further objects will be apparent from the following description taken in coordination with the drawings.

BRIEF DESCRIPTION OF THE DRAWINGS

The drawings are intended to be exemplary and to aid in the understanding of the invention. For purposes of clarity conventional symbols and drawing techniques are employed; the positive and negative terminals of the common power supply are indicated by (+) and (−) signs, respectively; the graphical presentations are qualitatively correct but do not indicate actual numbers or scales.

DESCRIPTION OF THE PREFERRED EMBODIMENTS

Figure 1A:
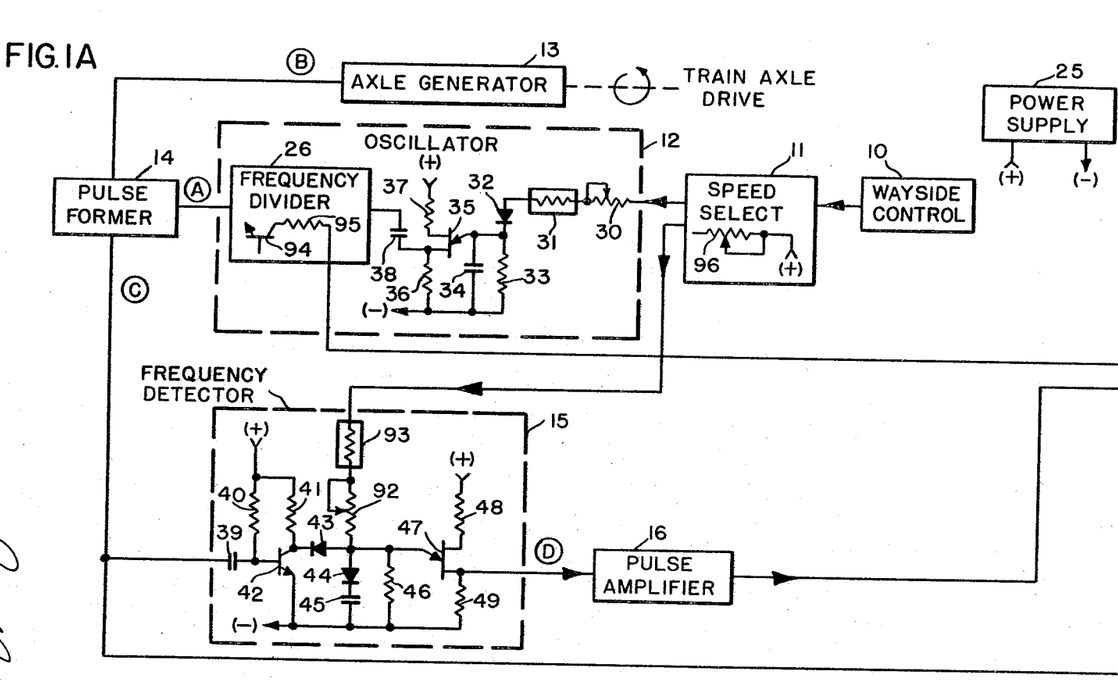
FIGS. 1A and 1B is a combination block diagram functional schematic of the improved frequency responsive train overspeed indicator.
Figure 1B:
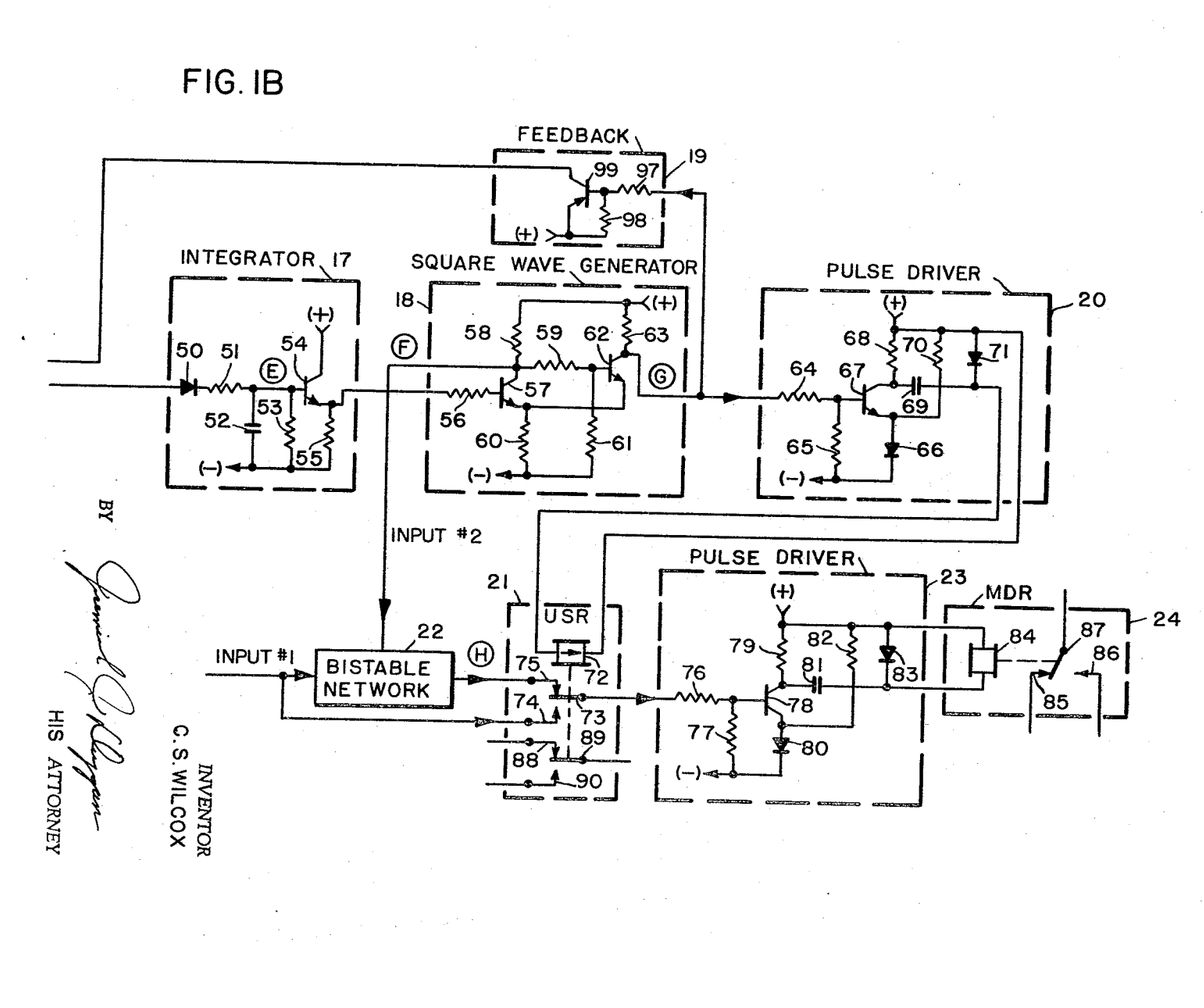

Referring to FIG. 1 the organization of the present invention is shown. A wayside control unit 10 is representative of units providing operational control signals transmitted from wayside apparatus which impose the desired speed controls on the train. These signals are usually picked up from the rails by train pickup coils, but depending upon the situation or the application, such commands may alternatively be transmitted by radio communication or possibly be contained within storage equipment located on the train itself.

The operational controls are acted upon by the speed select unit 11. This unit produces speed select signals commensurate with the desired speed. Separate speed select signals are produced for the different frequency responsive equipment to be controlled, which signals although distinct are interdependent regarding common circuitry and changes occurring therein. A speed select unit 11 may comprise resistor or diode matrices and other step impedance devices for producing speed select signals dependent upon the wayside or control inputs. It may also use continuously variable output devices such as potentiometers or variacs, which produce output signals continuously variable relative to a variable control. Any of these types of speed select devices may be used with equal facility with the frequency responsive governor of this invention. The input supply voltage for this unit is conducted through a variable resistor 96 which compensates for train wheel wear thereby preventing any discrepancy between the magnitude of the speed select signal and the actual train speed.

A check frequency oscillator 12 produces a check frequency signal for interrogating the integrity of the circuitry; this frequency is determined by the speed select unit 11 and is chosen to be greater than the generator frequency associated with the desired speed, this frequency difference is in actual practice approximately one hundred Hz. The oscillator may comprise any design capable of altering its frequency output in response to an input control signal, viz., the speed select signal. In this invention the oscillator 12 comprises a variable resistor 30 to which a DC input signal from the speed select unit 11 is applied. This variable resistor allows for adjustment and final calibration of the oscillator with respect to a desired frequency output relative to the speed select signal. The resistor 30 in turn connects to a thermally sensitive resistor 31 which provides a positive resistance characteristic, compensating the oscillator 12 circuit for temperature changes. The thermal resistor 31 connects to the anode of a diode 32. The cathode of the diode 32 connects to a parallel resistor 33-capacitor 34 network. The voltage across this parallel network provides the input signal to the emitter of unijunction transistor 35. The first base of transistor 35 is connected through resistor 37 to the positive terminal of the common power supply 25. The second base of the transistor 35 is connected through resistor 36 to the negative terminal of the power supply 25 as is one side of the parallel capacitor 34-resistor 33 network. The output signal of the oscillator is taken from the second base of transistor 35 through capacitor 38. The frequency characteristic of this oscillator circuitry varies directly with changes in the magnitude of the speed select signals which fact is obvious from the foregoing description. The oscillator also contains a frequency divider 26 of the bistable multivibrator type for reducing the magnitude of the frequency output and producing a pulse signal.

The axle generator 13 as shown diagrammatically in FIGS. 1A and 1B may consist of any practical arrangement wherein a frequency output signal proportional to train speed is achieved. In the apparatus of this invention the generator comprises a multitoothed wheel rotating in a magnetic circuit, coupled to the train axle drive to produce an output signal frequency proportional to speed. It may, however, in other circumstances as well comprise a magnetic member driven by the train axle causing a voltage to be induced in a field effective device or any other device sensitive to train speed capable of producing a proportional frequency output. The type or construction of the axle generator is not of significance to this invention as long as its output is proportional to train speed. The pulse former 14 sums the output of the axle generator and oscillator and produces a squared pulse signal for each resultant pulse signal of the summation input. Typically such pulse former may comprise a resistive summing network which output is conveyed to amplification and squaring circuitry, thereby producing a substantially square wave pulse output signal having a repetitive rate commensurate to the sum frequency of the axle generator and oscillator. The coil of the axle generator 13 is included in the pulse former 14 circuitry so as to prevent the generation of pulse upon any electrical failure in the generator 13.

The frequency detector unit 15 detects the presence of any signal input having a frequency in excess of the frequency commensurate with the desired speed of the train as established by the speed select unit 11. This desired speed frequency is the same frequency as produced by the generator at the desired speed. The output of the pulse former 14 is applied to the frequency detector 15 and whenever it exceeds the detection frequency a signal output comprising a series of pulses is developed. The detection frequency level of this unit is established by the output signal of the speed select unit 11, and the unit displays a detection frequency characteristic which varies inversely to changes in magnitude of the speed select signal. It is noted that the frequency characteristics of the oscillator 12 and the frequency detector 15 are converse with respect to changes in the magnitude of the speed select signals.

Typically the frequency detector comprises a capacitor circuit which is charged by the speed select signals each time a pulse input is derived from the pulse former unit 14. The voltage across this capacitor network is in turn utilized to control the firing of a transistor circuit which circuit produces the output pulse from the frequency detector 15. Although this is the type of circuit utilized in the present invention any frequency detector device capable of having the same inverse frequency characteristic may be equally well utilized. Specifically the circuit of this invention includes a capacitor 39 through which the input to the frequency detector 15 is conducted. This input is brought to the base of an NPN transistor 42. A resistor 40 is connected to the positive of common power supply 25 and provides an operating base bias for transistor 42, a collector load resistor 41 is also connected to the positive power supply 25. The emitter of transistor 42 is brought to the common terminal of the power supply 25. The output of transistor 42 is conducted from the collector to the cathode of diode 43 which is connected from its anode to the anode of diode 44 and thence through diode 44 to a capacitor 45 which is connected to common. A variable resistor 92 conducts the output signal from the speed select unit 11 to the junction of diodes 43 and 44. Again similar to the variable resistor 31 in the oscillator 12 the variable resistor 92 provides for calibration. A resistor 46 is parallel arrayed across capacitor 45 and from the junction of this resistor 46 diode 44 and capacitor 45 the input signal to the emitter of unijunction transistor 47 is taken. The first base of transistor 47 is conducted through a resistor 48 to the positive terminal of the power supply 25 and the second base, from which its output is taken, is conducted through resistor 49 to common.

The output of frequency detector 15 is conducted to a pulse amplifier 16. This amplifier may consist of any number of well known designs and specifically may be a monostable multivibrator. The amplified output is conducted to an integrator unit 17. The integrator unit 17 provides an output signal whenever a predetermined number of pulses is received within a predetermined period. It comprises a diode 50 to which anode the input is connected. A resistor 51 and a capacitor 52 connected in series between the cathode and diode 50 and common establish a fixed integration period for the input signals. A resistor 53 arrayed across the capacitor 52 provides base biasing for NPN transistor 54 which transistor base is connected to the junction of resistor 51 and capacitor 52. The collector of transistor 54 is brought to the positive terminal of the power supply 25 and the emitter is conducted through resistor 55 to common. The output of the integrator 17 is taken from the emitter of transistor 54 this stage forming an emitter follower output circuit having a gain of approximately unity.

A square wave generator 18 is utilized to produce a square wave signal relative to the output signal of the integrator 17. The circuit utilized in this embodiment is known as a Schmitt trigger circuit but may comprise any of well known squaring circuit designs. Specifically it includes a resistor 56 conducting the output of integrator 17 to the base of a transistor 57. This transistor 57 is regeneratively coupled through a resistor 59 to the base of a second transistor 62. These transistors are both NPN types. The emitter of both transistors 57 and 62 are connected together and conducted through a common emitter resistor 60 to common. Resistors 58 and 63 form the collector resistors for transistors 57 and 62, respectively.

The presence of an input signal at resistor 56 causes transistor 57 to attain a conducting state which in turn causes transistor 62 to become nonconducting. As transistor 62 reaches a nonconducting state an output voltage appears on its collector 62. When the input signal to resistor 56 falls below a predetermined design value the transistor 57 commences to go toward a nonconducting state. This produces a rise in voltage on its collector which is coupled to the base of transistor 62 which is then forced toward a conducting state. This collector to base coupling and common emitter resistor coupling regeneratively forces a rapid change in the conducting states of transistors 57 and 62 thereby causing the voltage on the collector of transistor 62 to almost instantaneously be reduced to its initial low value. Thus, when output signal from integrator 17 exceeds a predetermined magnitude and then falls below a second predetermined magnitude, the square wave generator 18 produces a square wave signal output.

A feedback switching network 19 is connected to the output of the square wave generator 18 at the collector of transistor 62. It comprises any voltage sensitive switch which changes conductance state dependent upon the presence or lack of signal from square wave generator 18. Preferably this network comprises an PNP transistor 99 having base biasing resistors 97 and 98, when a signal appears from square wave generator 18, transistor 95 becomes nonconducting which cuts off common from the frequency divider 26. Thusly, the feedback switching network 19 suppresses the output of the oscillator 12 whenever it is actuated by the presence of a signal output from the square wave generator 18.

The output of the square wave generator 18 is also conducted to a pulse driver 20. This pulse driver unit 20 provides an energizing signal as long as an input is present on an intermittent basis of greater than a minimum repetition rate. This driver comprises an input resistor 64 in series with a resistor 65 which is connected to common. Resistors 64 and 65 determined the biasing level of an NPN transistor 67, the input to the base of transistor 67 being taken from their junction. The collector load resistor 68 is connected to the positive supply source and the emitter is connected through forward biased diode 66 to common which diode provides a switching bias level for transistor 67. A resistor 70 is connected from the positive terminal of this voltage source to the emitter of transistor 67 thereby providing a bias signal across the diode 66. A capacitor 69 is connected from the collector of transistor 67 to an output of the pulse driver 20. A diode 71 is forwardly connected between the capacitor 69 output side and the positive supply. The second output of pulse driver 20 is taken from the junction of the diode 71 and positive supply terminal. When an input signal of sufficient magnitude to overcome the bias supplied by diode 66 is applied, transistor 67 is turned on and results in charging capacitor 69 through the forwardly connected diode 71 and the conducting transistor 67 and diode 66. This charge path provides a rapid charging time constant for capacitor 69. When the output of the square wave generator 18 falls to its minimum level the transistor 67 again becomes nonconducting and the charge previously established across capacitor 69 is discharged through the USR21 relay and resistor 68. The USR21 is a biased relay which responds to current flow in the direction shown only, any short circuit in transistor 67, capacitor 69 or diode 71 wire prevents USR21 from operating.

The USR relay indicating an underspeed condition is energized by the output of the pulse driver 20. It remains energized for as long as an intermittent signal is applied to the pulse driver 20 thereby maintaining an energizing output signal. The USR relay 21 maintains its energization during periods when the pulse driver 20 is in receipt of a signal due to the presence of diode 71 in the pulse driver forming a slow release time constant for the relay. Continued energization of the USR relay 21 indicates a safe underspeed condition. However, should any failure occur in the associated driving circuitry, the axle generator or oscillator, or further should a continued axle generator signal having frequency greater than the detector frequency be produced for more than a predetermined period or interval, then the USR relay will become deenergized after such predetermined period due to resultant discharge of capacitor 69, thereby indicating an apparent overspeed condition.

The motion detector relay 24 is similar to the underspeed relay 21 associated with a pulse driver 23. This combination of pulse driver 23 and motion detector relay 24 operates and comprises the same circuitry as that of pulse driver 20 and underspeed relay 21. The input to the pulse driver 23 is conducted through contact arm 73 of the underspeed relay 21 so that its input signal varies depending upon the energized or unenergized condition of the underspeed relay 21. In normal operation the underspeed relay 21 is energized and the output to the pulse driver 23 is taken through contact 75 from the output of a bistable network 22.

The bistable network 22 is a double input bistable multivibrator circuit. The inputs to this network are derived from the output of the pulse former 14 and the collector of transistor 57 of the square wave generator 18. The continued changing of stable states in the bistable network 22 is established by the intermittent signal on the collector of transistor 57 and alternately the pulsating signal from the pulse former 14. The signal on the collector of transistor 57 is only present when the output signal from the integrator 17 is below a predetermined value due to the lack of output signal from the oscillator 12 when cut out by the feedback switching network 19 with the generator frequency below the detector frequency. The output from the pulse former 14 is always present as long as the axle generator 13 produces a signal relative to train speed. Thus the bistable network is switched back and forth by the signal output of the pulse former 14 and the intermittent signal from the square wave generator 18. It can be thus seen that energization of the motion detector relay 24 is dependent upon the continued changing state of the bistable network 22 induced by the presence of the axle generator 13 signal and the proper operation of the oscillator 12, frequency detector 15, pulse amplifier 16, integrator 17 circuit and feedback 19. Failure in any of these elements will cause the motion detector relay to become deenergized. Thus the motion detector relay 24 provides a further integrity check of the overspeed frequency responsive apparatus.

During intervals when an overspeed condition is indicated by the falling of the underspeed relay 21, the input to the pulse driver unit 23 is brought directly from the pulse former 14 through contact 74 thereby providing an intermitent input to the pulse driver 23 as long as the axle generator 13 continues to produce a signal responsive to train speed. It is considered that the operation of the motion detector relay 24 is relatively fail-safe during underspeed operation due to the requirement that both axle generator 13 and square wave generator 18 signals be present for its continued energization. During the overspeed condition where it is driven exclusively by the axle generator 13 output, it is no longer required to be fail-safe since the apparatus already indicates an overspeed or unsafe condition. In any event the motion detector relay constitutes a continuing check on the presence of the axle generator signal and its failure during normal operation indicates an unsafe or out-of-order condition.

The operation of this apparatus under normal running conditions will now be investigated. Assuming a particular speed control signal has been derived from the wayside control 10 the speed select unit 11 establishes DC analog voltage speed select signals for the oscillator 12 and detector 15 relative to the desired speed. Other equipment on the train associated with the throttle control, etc., develop power sufficient to increase the train speed to the value in response to the speed select unit 11.

The axle generator 13 develops a frequency directly correlated to actual train speed, normally the axle generator is directly coupled to the axle of the train through linkages establishing the desired angular rotational ratios. Alternatively, this signal may be derived from other sources such as velocity, gyros, etc., having the necessary circuitry to develop a corresponding analog frequency signal.

The oscillator speed select signal is conducted to variable resistor 30 in the oscillator 12, this signal causes a buildup of charge across capacitor 34 which when establishing a capacitor voltage level of a predetermined value initiates the firing or triggering of the unijunction transistor 35 producing a signal output across resistor 36. The component values of the circuitry are chosen so that the signal across the capacitor builds up and discharges through transistor 35 at a rate producing an output frequency somewhat in excess of the axle generator frequency 13 for the desired speed. In actual practice it is maintained approximately one hundred cycles greater to assure detection by the frequency detector unit 15. The oscillator circuitry is further designed to display a frequency characteristic directly related to changes in its input signal; observation of the circuitry shows as the speed select signal input decreases the oscillator frequency also decreases in that the level of charging source for capacitor 34 is reduced. The relationship between changed input signal and resultant variation in output frequency is chosen so as to produce frequency signals commensurate with that of the axle generator 13 for desired speeds.

The output of the oscillator 12 through capacitor 38 and the generator 13 are conducted to the pulse former unit 14. The pulse former unit 14 previously described functions to sum the output frequency of the axle generator 13 and the oscillator 12 and to produce square wave output pulses of desired magnitude having a repetition rate correlative to the sum frequency.

Figure 2:
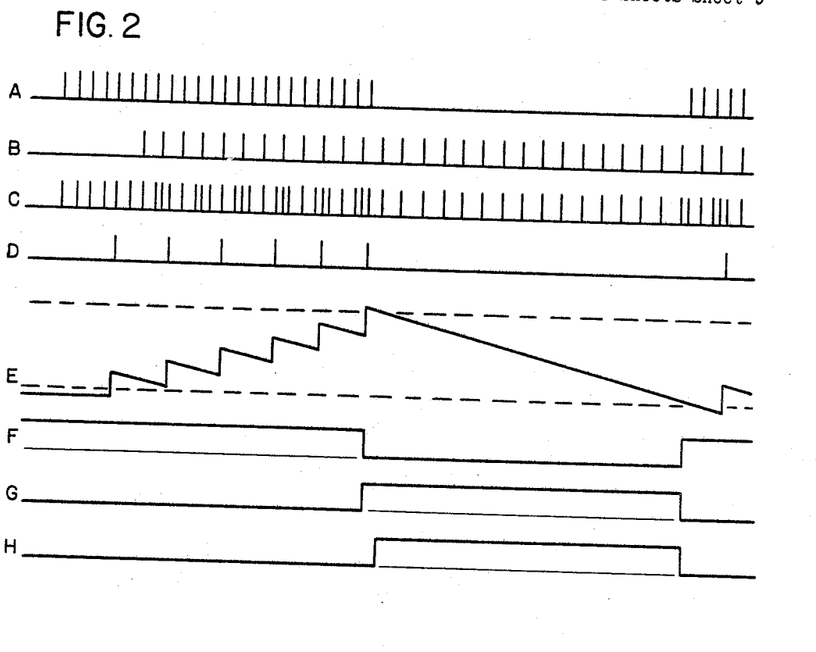
FIG. 2 is a series of graphical representations of typical wave forms present at various portions of the system during normal operation.

Referring to FIG. 2, graphical representations A and B show idealized wave forms for the signal outputs derived from the oscillator 12 and axle generator 13 respectively. The letter referrals in FIGS. 1A and 1B indicate that portion of the circuitry where the wave form signals exist. The graphical presentation for the output signal at C indicates the sum frequency output pulses derived from the pulse former 14. Inspection shows that this frequency is higher during those portions of the operation during which a signal is derived from both the axle generator 13 and oscillator 12 and significantly less during periods of operation in which only the axle generator signal is present.

The pulse former signal representation is shown as positive going signals for matters of drawing convenience. It is actually a negative going pulse which fact is necessary to consideration of the actual operation of the specific circuitry.

The output of the pulse former 14 now consisting of the sum frequency pulses is conveyed to the frequency detector 15. The frequency detector 15 is controlled by the detector speed select signal from the speed select unit 11 to establish a minimum frequency value of input signal for which it will produce an output signal. The input signal is brought to capacitor 39 which in turn is connected to the base of transistor 42. With the occurrence of each pulse exceeding the switching values established by bias resistor 40, transistor 42 which is normally conducting due to the positive bias established by resistor 40 becomes nonconducting by the introduction of the negative pulses through capacitor 39. Each instant where transistor 42 becomes nonconducting the speed select signal conducted through variable resistor 92, thermal resistor 93, and forwardly connected diode 44 charges capacitor 45. When transistor 42 conducts this charging voltage is shorted through the transistor 42 and cannot charge capacitor 45 which capacitor during those instances commences to discharge through resistor 46. When the repetition rate of the input pulses is sufficiently high the charging rate exceeds the discharge rate of capacitor 45 and effects a buildup of voltage across capacitor 45 which is introduced to the emitter of unijunction transistor 47. When a sufficient number of pulses has been received to raise the voltage across capacitor 45 to a predetermined level, transistor 47 is triggered and establishes an output signal across its base resistor 49. Thus dependent upon the setting of variable resistor 92 and the value of the speed select signal, the frequency detector requires a particular number of input pulses to be received during a selected interval of time before producing an output pulse. The duration of the output pulse is relatively short due to the rapid discharge path established through transistor 47 and resistor 49. Each time the capacitor 45 discharges the pulse output ends and the capacitor is recycled by the input pulses. This buildup of charge and resultant output signal sequence will continue as long as input pulses having a repetition rate greater than the value as determined by the variable resistor 92 and speed select signal continue to be received by the frequency detector 15. The value of repetition rate or frequency established by the speed select signal and speed detected circuitry is that value of frequency which will be produced by the axle generator 13 when the train attains the desired operational speed. Thus the frequency detector 15 detection frequency is continuously correlated by the detector speed select signal to the axle generator 13 frequency output over the entire range of desired speed controls.

Referring to FIG. 2D illustrated are the output pulses derived from frequency detector 15 when in receipt of an input signal having a repetition rate greater than the selected value. Analysis of the circuitry of the frequency detector 15 shows that as the speed select signal increases the detection frequency will decrease and vice versa as the speed select signal increases. This is obviously demonstrated by the fact that the repetition rate is primarily determined by the charging rate of capacitor 45 and that the charging rate of capacitor 45 will directly increase with increases in the speed select signal which is the charging source. Therefore a fewer number of pulses will result in attaining a higher voltage across capacitor 45 with increases in the speed select signal. Therefore as in the case of oscillator 12, any variations in the level of the output speed select signals caused by contact resistance, supply voltage change, etc., in the circuitry, common to both speed select signals, of the speed select unit 11 results in a change of the oscillator and detector frequencies for a desired speed operational control.

The output of the frequency detector 15 is amplified by the pulse amplifier 16. This unit provides the necessary pulse magnitudes for driving the remaining associated circuitry. The amplified pulses are conducted to the input of integrator 17. The integrator unit 17 requires a particular number of output pulses with a particular period or span of time to produce an output signal. The input signal to the integrator 17 charges a capacitor 52 through a diode 50 and resistor 51. The receipt of each pulse produces a build-up of voltage across capacitor 52 as long as the charging rate due to the pulses exceeds the discharging rate of capacitor 52 through resistor 53 in parallel with the base to emitter junction resistance of transistor 54. If this condition is satisfied the signal across capacitor 52 continues to build. A typical wave form showing the rising voltage characteristic across capacitor 50 and its eventual discharge through transistor 54 is indicated in FIG. 2 wave form E. Thus when the input frequency to the frequency detector 15 exceeds the frequency detection value the integrator 17 will produce an increasing output signal. The output of the integrator 17 is then squared by the square wave generator 18. As the signal input to resistor 56 increases and causes transistor 57 to become conductive, this as previously described regeneratively produces an almost instantaneous rise in output signal on the collector of associated transistor 62. The upper broken line in FIG. 2E indicates the level at which transistor 57 becomes conductive. The signal output of the square wave generator is depicted at point G in FIG. 2. With the presence of this signal, transistor 99 in the feedback switching network becomes non-conductive and causes the oscillator 12 to be shut off.

The cessation of signal from the oscillator 12 reduces the sum frequency input to the frequency detector 15 below the frequency detection value. This is indicated in FIG. 2C; during this period the only pulses present are those derived from the axle generator 13. This condition continues until the integrator 17 output signal falls below the value necessary to maintain transistor 57 of the square wave generator 18 conducting. This value is indicated by the lower broken line of FIG. 2D. At the instant the integrator output falls below this value the output signal, G, from the square wave generator 18 goes toward a zero or approximately zero value and results in once again allowing transistor 95 to become conductive. Upon this occurrence the oscillator is again turned on producing output signal of desired frequency thereby resulting in the presence at the input of the frequency detector 15 of a sum frequency signal exceeding the detection frequency value. The presence of such signal again eventually causes the square wave generator 18 to produce another output signal and so in turn repeats the whole process, once again shutting the oscillator 12 off. This oscillating or intermittent operation continues for as long as the input frequency to the frequency detector unit 15 remains below the frequency detection value when the oscillator 12 output is reduced to zero.

The pulse driver unit 20 as previously described maintains the underspeed relay 21 in an energized condition for as long as the intermittent output of square wave generator 18 continues.

At this junction it is apparent that the apparatus serves to indicate an overspeed or unsafe condition whenever the sum frequency signal presented to the frequency detector 15 is maintained greater or less than the frequency detection value for longer than the predetermined interval relative to the holding time of the pulse driver 20 and relay 21. This is due to the complete absence or continued presence of an output signal from the square wave generator 18 which fails to satisfy the intermittent signal condition necessary for the pulse driver 20 to continuously energize the underspeed relay 21. It is therefore obvious that should the axle generator 13 output signal frequency reach a value commensurate with an overspeed condition the sum frequency detector input signal will continuously exceed the frequency detection value and result in the indication of an overspeed condition. Further, should there be a failure in the integrity of the circuitry, resulting in failure to produce intermittent output signals from the integrator 17 it similarly results in the indication of an out-of-order condition.

Figure 3:
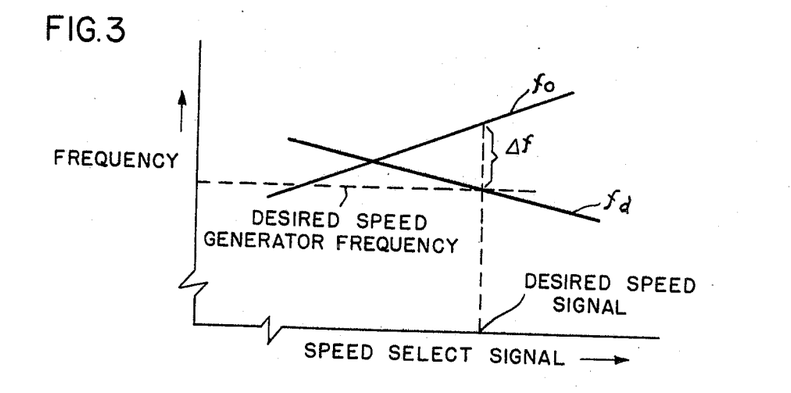
FIG. 3 is a graphical presentation of the oscillator and detector frequency characterized for variations in speed select signals.

Now assuming that during operation the select unit 11 malfunctions causing the speed select voltage to decrease, the frequency detection value would rise to a higher value and thus apparently allow the train to reach a higher speed than desired in that the axle generator signal would necessarily be required to reach a greater magnitude before a steady output signal would be derived from the frequency detector 15. However, the incorporation in this invention of an oscillator having a frequency characteristic which varies directly with changes in speed select signals completely overcomes this otherwise possible unsafe condition. Referring to FIG. 3 showing the frequency characteristics of both the oscillator and frequency detector, it is apparent that as the speed select voltage magnitude decreases the rising characteristic of the frequency detector 15 and the falling characteristic of the oscillator 12 will intersect at a preselected value of speed select signal. This intersection indicates a point at which the frequency detector unit 15 will no longer respond to the oscillator 12 frequency signal; such lack of response causing a cessation of intermittent signals from square wave generator 18 and deenergization of the underspeed relay 21, thereby indicating an unsafe condition. If not for the converse characteristics of these two units, the axle generator frequency would be allowed to attain a higher value before the underspeed relay 21 would be released.

Additionally present in this apparatus is a motion detection relay 24 which serves as a further integrity check on the overspeed response of the apparatus as well as an indication of actual train movement. The motion detector relay 24 is energized by a pulse driver unit 23 comprising resistors 76, 77, 79 and 82, diodes 80 and 83, transistor 78, and capacitor 81. This unit works exactly in the same manner as a pulse driver 20 for the underspeed relay 21. The input to the pulse driver 23 is derived through the contact arm 73 of the underspeed relay 21 through either front contact 75 or back contact 74. When the train is operating in a normal underspeed condition the underspeed relay is energized and the input of the pulse driver 23 is conducted through the front contact 75 and the contact arm 73. The intermittent input signal required for continuous energization of the motion detector relay 24 is a product of the bistable network 22. This bistable network is a dual input having an output changing in coordination with the imposition of signals on each of its inputs. Input #2 is taken from the collector of transistor 57 in the square wave generator 18. It is depicted in FIG. 2 as the wave form for point F. As apparent from previous discussion, when in an underspeed condition the square wave generator 18 produces an output signal on the collector of transistor 57 in time coordination with the end of its output signal at point G the collector of transistor 62. Each time a signal appears at point F which is concurrent with the decrease of the integrator unit 17 output signal below its lower predetermined magnitude a change in the output signal of the bistable network occurs.

The output signal appearing at point F at this instant is a positive going signal due to the fact that transistor 57 goes into a nonconducting state thus bringing its collector to a potential substantially equal to the positive supply. This positive going signal initiates a change in the output signal of the bistable network which in this particular instance is a negative going signal. The bistable network 22 remains in this state until a new signal output is obtained from the integrator 17 at which time transistor 57 again turns on and the positive voltage on its collector goes toward zero. After the removal of this positive signal, the next occurring pulse former 14 signal relative to an axle generator pulse causes the bistable network 22 to flip back to its opposite state, this pulse being applied to the other input of the network. At the point when the input signal on the first input flips the bistable network 22 only the axle generator 13 signal is present at the output of the pulse former unit 14 as dictated by the shutting down of the oscillator 12 by the feedback switching network 19.

The presence of an intermittent signal on the output of the bistable network 22 is maintained by the continuing proper operation of the overspeed frequency responsive apparatus. If either the axle generator 13 or the check oscillator frequency 12 fails, it results in deenergization of the motion detector relay and indicates an improper or out-of-order condition. During an overspeed condition when the underspeed relay 21 is deenergized the output signal of the axle generator 13 is conducted through back contact 74 and contact arm 73 of the underspeed relay 21 to the input of the pulse driver 23 from the pulse former 14. This signal comprising a series of pulses then provides the intermittent signal necessary to maintain the motion detector relay energized. As previously mentioned during this period since the apparatus has already indicated an unsafe or improper working condition it is not necessary that the motion detector relay circuitry present as fail-safe an aspect as during underspeed operation. The incorporation of such fail-safe motion detection circuitry prevents the situation arising where a complete failure in the output of the axle generator would allow the train to attain an overspeed condition without any apparent indication. The requirement of both axle generator and check oscillator signals for the proper operation of this circuitry establishes a substantially fail-safe and reliable design.

The underspeed relay 21 as well as the motion detector relay 24 through their other contacts and arms, for example, contacts 88 and 90 and contact arm 89 in underspeed relay 21, and contacts 85 and 86 and contact arm 87 in motion detector relay 24 control other application and logic circuitry intended to impose necessary commands and controls on the operation of the train. The nature and manner of these controls is not necessary to an understanding of this improved overspeed indicator and are therefore not presented herein.

In summary, a fail-safe frequency responsive train overspeed indicator has been described and set forth in this specification. It satisfies the various objects of the invention by incorporating an oscillator adapted to have a frequency output characteristic which falls with respect to decreases in speed select signals whereby the oscillator signal frequency goes below the detection frequency of the frequency detector unit 15 and signifies through the operation of the associated circuitry an indication of overspeed and out-of-order condition. It further provides for the incorporation of a fail-safe motion detector relay which indicates the occurrence of a possible overspeed condition upon the failure in output of the axle generator 13 signal and/or other circuitry associated with the frequency responsive apparatus.

The foregoing description and analysis is presented as exemplary of the present invention. It is therefore not intended that this description delimit the invention in terms of the various applications and modifications to which it may be susceptible. It is intended that all those modifications and adaptations of the invention apparent to one skilled in the art upon a reading of this disclosure be considered to fall within the scope and spirit of the invention.

What I claim is:

1. Apparatus for indicating an overspeed condition of a vehicle with respect to a desired speed dictated by speed select signals comprising:

a generator adapted to produce a signal having a frequency directly proportional to vehicle speed;

an oscillator controlled by a speed select signal to provide an output frequency exceeding the generator frequency relative to the desired speed;

a detector responsive to both the generator and oscillator signals controlled by a second speed select signal to provide an output whenever the sum frequency of the generator and oscillator signals exceeds the frequency relative to the desired speed, the detector frequency response characteristic varying inversely with respect to changes in the detector speed control signal;

circuit means responsive to the detector output for producing an output signal and rendering the oscillator inoperative whenever the sum of the detector input signals exceeds the desired speed frequency for a predetermined period thereby providing an intermittent output signal as long as only the oscillator signal exceeds the desired speed frequency; and indicator means responsively energized by the intermittent circuit means output provided the output reoccurs at greater than a minimum rate, the deenergization of the indicator means manifesting an overspeed condition;

wherein an improvement comprises;

the oscillator adapted to display an output frequency characteristic which varies directly with respect to changes in the oscillator speed select signal whereby an overspeed condition is prevented from occurring when the oscillator and detector speed select signals each respectively decrease more than preselected magnitudes causing the oscillator frequency to fall below the detection frequency which effects a loss of the circuit means recurrent output and deenergizes the indicator means thereby manifesting an overspeed condition.

2. The apparatus of claim 1 wherein the improvement further includes, means responsive to the circuit means recurrent output and the generator signal for indicating vehicle motion when not in an overspeed condition, and responsive to only the generator signal for indicating motion when in an overspeed condition.

3. The apparatus of claim 2 wherein:

the oscillator includes, a parallel resistor-capacitor network charged by the oscillator speed select signal through a series resistance, and a transistor switch adapted to change its conductance state and discharge the network each time the voltage across the network exceeds a first predetermined value; and the detector includes, a pulse forming circuit responsive to both the oscillator and generator signals for producing pulses having a repetition rate relative to the sum frequency of both signals, a first transistor switching circuit having a charged conductance state in conjunction with and for the duration of each pulse produced by the pulse forming circuit, a parallel resistor-capacitor network charged by the detector speed select signal through a series resistance during the time the transistor switch is in the charged state, and a second transistor switch altering its conductance state and discharging the network whenever the network voltage exceeds a second predetermined value thereby producing an output pulse.

4. The apparatus of claim 3 wherein the motion indicating means includes:

a two input bistable network, each input inducing a change in state when receiving an input signal in the absence of an input signal on the other, the first input responsive to the recurrent output signal of the circuit means, the other input responsive to the pulse forming circuit output pulses, each change in state producing a resultant change in output signal;

motion indicator means responsively energized by the changing state of the bistable network for manifesting motion when not in an overspeed condition and responsively energized by only the generator signal for manifesting motion when in an overspeed condition, provided the change of state and the generator signals reoccur at greater than the selected minimum rate.

5. The apparatus of claim 3 wherein the oscillator transistor switch and the detector second transistor switch include, a unijunction transistor which becomes conducting whenever the voltage across the resistor-capacitor network exceeds the predetermined value.

6. The apparatus of claim 4 wherein both the overspeed indicator means and the motion indicator means comprise, a transistor switching circuit having a changed conductance state in conjunction with and during changes in the level of input signals, a capacitor charged during the changed conductance state of the transistor switching circuit, a diode serially connected to the capacitor through which the capacitor is charged, a resistor connecting in parallel to the diode and the capacitor, and a relay disposed across the diode whereby it is energized by the capacitor charge whenever the transistor switching circuit is not in its changed conductance state and deenergized through the diode when the capacitor is charging, the diode discharge path preventing the relay from rapidly being deenergized, the deenergization time being selected to be of greater duration than the period between changes in level of the input signal.

7. The apparatus of claim 5 wherein the relay comprises a polarized device thereby only energizable by the voltage established across the capacitor when charged through the diode.

8. The apparatus of claim 5 wherein the circuit means includes, a pulse amplifier for increasing the magnitude of the pulses produced by the detector, means for integrating the output pulses of the amplifier over a selected period, a feedback transistor switch responsive to the integrated signal for rendering the oscillator continuously inoperative for as long as the integrated signal exceeds a predetermined magnitude, and squaring circuit means responsive to the integrated signal for producing two substantially instantaneous output signals whenever the integrated signal exceeds the predetermined magnitude, and substantially instantaneously extinguishing the output signals whenever the integrated signal decreases below a second predetermined magnitude, the two output signals having converse voltage characteristics, one output providing input signals to the overspeed indicator means, the other providing one input signal to the bistable network.

9. The apparatus of claim 8 wherein the feedback transistor switch is normally on for conducting energy to the oscillator and is rendered nonconducting whenever the integrator output exceeds the predetermined magnitude whereby the oscillator output is suppressed.

10. The apparatus of claim 9 wherein
the integrator comprises, a diode having an anode connecting to the pulse amplifier output, a first resistor connecting to the diode cathode, a capacitor serially connecting to the first resistor for storing charge relative to each pulse input received, a second resistor in parallel with the capacitor, and a transistor emitter follower having its base input connecting to the junction of the capacitor and the second resistor for providing an output signal relative to the charge on the capacitor, the combination of the second resistor and emitter follower forming a discharge path for the capacitor thereby establishing the selected integration period; and the squaring circuit comprises, an emitter coupled multivibrator having a first transistor normally off which transistor is turned on when the integrator signal reaches the predetermined magnitude and turned off when the integrator signal falls below the second predetermined magnitude, and a second transistor having its base input taken from the collector of the first transistor and substantially instantaneously turning off and on in conjunction with the first transistor turning on and off, thereby producing on the collector of each transistor positive going out-of-phase output signals.

References Cited

UNITED STATES PATENTS 2,719,912 10/1955 Maenpaa.
3,270,199 8/1966 Smith.

ARTHUR L. LA POINT, Primary Examiner

G. H. LIBMAN, Assistant Examiner

U.S. Cl. X.R.

246—187